(12) United States Patent
Kitamura

(10) Patent No.: US 6,747,704 B1
(45) Date of Patent: Jun. 8, 2004

(54) VIDEO CAMERA APPARATUS CAPABLE OF SIMPLY EXTRACTING BRIGHTNESS INFORMATION USED IN AUTO-IRIS CONTROL

(75) Inventor: Jun Kitamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 589 days.

(21) Appl. No.: 09/035,425

(22) Filed: Mar. 5, 1998

(30) Foreign Application Priority Data

Mar. 21, 1997 (JP) .......................................... P9-068356

(51) Int. Cl.[7] .......................... H04N 5/238; H04N 9/73; H04N 5/235; H04N 3/14
(52) U.S. Cl. ................. 348/363; 348/223.1; 348/229.1; 348/280
(58) Field of Search ................................. 348/223, 224, 348/225, 227, 655, 362, 363, 364, 366, 234, 237, 223.1, 224.1, 225.1, 227.1, 235

(56) References Cited

U.S. PATENT DOCUMENTS

| | | | |
|---|---|---|---|
| 4,998,162 A | | 3/1991 | Kondo et al. |
| 5,128,769 A | * | 7/1992 | Arai et al. .................... 348/224 |
| 5,526,046 A | * | 6/1996 | Kondo .......................... 348/224 |
| 5,999,215 A | * | 12/1999 | Tamura ........................ 348/224 |

* cited by examiner

Primary Examiner—Ngoc-Yen Vu
Assistant Examiner—Rashawn N. Tillery
(74) Attorney, Agent, or Firm—Frommer Lawrence & Haug LLP; William S. Frommer; Dennis M. Smid

(57) ABSTRACT

In a video camera apparatus, a proper iris control operation can be carried out based upon pseudo-luminance information, and the iris control operation and also the focus control operation can be independently performed. The R, G, B pixel data which are outputted from a CCD image sensor and are acquired before being inputted to an image signal processing unit are multiplied with each other so as to produce the pseudo-luminance information instead of the luminance signal. The iris control operation is carried out based on this pseudo-luminance information. Also, the respective R, G, B pixel data acquired before being inputted to a white balance amplifier are multiplied with each other to produce the pseudo-luminance information.

8 Claims, 4 Drawing Sheets

FIG.4

| | | | | | | | | | |
|---|---|---|---|---|---|---|---|---|---|
| n | R | G | R | G | R | G | R | G | R | G |
| n+1 | G | B | G | B | G | B | G | B | G | B |
| n+2 | R | G | R | G | R | G | R | G | R | G |
| n+3 | G | B | G | B | G | B | G | B | G | B |
| n+4 | R | G | R | G | R | G | R | G | R | G |
| n+5 | G | B | G | B | G | B | G | B | G | B |

. . . . .

VIDEO CAMERA APPARATUS CAPABLE OF SIMPLY EXTRACTING BRIGHTNESS INFORMATION USED IN AUTO-IRIS CONTROL

BACKGROUND OF THE INVENTION

The present invention is generally related to a video camera apparatus with using an image sensor, e.g., a CCD. More specifically, the present invention is directed to a video camera apparatus capable of simply extracting brightness information used in an auto-iris control.

In general, video camera apparatuses with employing CCDs (charge-coupled devices) as solid-state image pick-up devices are widely marketed. These video camera apparatuses are equipped with various functions, for instance, auto-iris control (automatic diaphragm control), auto-focus control, auto-white balance control, and the like. These functions are automatically controlled by employing the feedback loops.

A typical automatic function controlling arrangement of the conventional video camera apparatus is represented in FIG. 1 and FIG. 2.

In the first circuit arrangement of FIG. 1, in response to imaging light entered via a lens system 21 into a CCD 22, for example, the respective pixel signals R (red), G (green), and B (blue) are outputted from this CCD 22.

The gains of these R, G, B pixel signals are controlled by an AGC (auto-gain control) circuit 23, and thereafter the gain-controlled R, G, B pixel signals are converted into digital pixel data by an A/D converter 24. Then, after the digital clamping process is performed to these digital pixel data by a clamp circuit 25, preselected gains are applied to the respective R, G, B pixel data by a white balance amplifier 26 in order to perform the white balance.

After the gain control for the white balance control is carried out, each of the resulting pixel data is supplied to a luminance signal (Y-signal) processing circuit 27 and a chrominance signal processing circuit 28.

In this luminance signal processing circuit 27, the camera process operations such as the γ (gamma)-correction and the white clipping are carried out with respect to the R, G, B pixel data supplied to this luminance signal processing circuit 27, and further a luminance signal (Y-signal) is produced by executing the matrix calculation process with using the R, G, B pixel data. Thus, this luminance signal functioning as the imaging data is supplied from this luminance signal processing circuit 27 to the post-stage circuits.

Also, the chrominance signal processing circuit 28 produces color difference signals "R-Y" and "B-Y" by performing the matrix calculation process with employment of the camera-processed R, G, B pixel data, and thereafter outputs these color difference signals "R-Y" and "B-Y" to the post-staged circuits.

The gains which are applied to the respective color pixel data by the white balance amplifier 26 are controlled by the feedback loop. To execute this feedback control, it is required to detect the levels as these color signals, i.e., R (red) signal, G (green) signal, and B (blue) signal. To this end, the R signal, the G signal, and the B signal are extracted from the chrominance signal processing circuit 28, and signal levels thereof are detected by an auto-white balance detecting unit 31. The level information $D_{AWB}$ of the respective color pixel data are supplied to a controller 32 constituted by a microcomputer (not shown in detail), and the gains of the respective colors used in the white balance are calculated. For example, the gains with respect to the R signal and the B signal are calculated in order that both the R signal and the B signal own the same signal levels with regard to the level of the G signal under such a condition that the reference imaging object is imaged by the video camera apparatus. Then, the white-balance gain control information $S_{AWB}$ is supplied to the white balance amplifier 26 so as to control, for example, the gain of the R signal and the gain of the B signal.

On the other hand, the luminance information of the image signals are used in the auto-iris operation and the auto-focus operation. That is, the luminance signal produced in the luminance signal processing circuit 27 is extracted to be supplied to the auto-iris detecting unit 29 and the auto-focus detecting unit 30.

In the auto-iris detecting unit 29 and the auto-focus detecting unit 30, the diaphragm controlling information $D_{AE}$ and the focus controlling information $D_{AF}$ are extracted, and then are supplied to the controller 32.

In response to the diaphragm (iris) controlling information $D_{AE}$, namely the brightness information, the controller 32 supplies an iris control signal $S_{AE}$ to a timing generator 34 and an AGC circuit 23 in order to control the CCD exposure time and the gains, so that the iris control can be performed.

Also, in response to the focus controlling information $D_{AF}$, namely, such information corresponding to the focusing condition of the lens system 21, the controller 32 supplies a focus control signal $S_{AF}$ to a focus motor 33 so as to move a focus lens employed in the lens system 21, so that proper focusing conditions can be realized.

FIG. 2 schematically shows another structural example of the conventional camera apparatus. It should be noted that the same reference numerals shown in FIG. 1 will be employed as those for denoting the same, or similar circuit portions, and therefore, descriptions thereof are omitted.

In this conventional video camera apparatus, a luminance signal producing unit 35 is provided independent from the luminance signal processing circuit 27 in order to acquire brightness information and the like in the auto-iris detecting unit 29 and the auto-focus detecting unit 30. In other words, the respective R, G, B pixel data outputted from the white balance amplifier 26 are supplied to the luminance signal producing unit 35 to thereby produce such a luminance signal used in the auto-iris detecting operation and also the auto-focus detecting operation.

The above-described conventional circuit arrangements own the below-mentioned problems.

In the case of the circuit arrangement shown in FIG. 1, the luminance signal used in the auto-iris detecting operation and in the auto-focus detecting operation is derived from the luminance signal processing circuit 27. This luminance signal corresponds to such a signal produced by executing a large number of process operations to the original pixel signal in the luminance signal processing circuit 27. As to the auto-iris operation, this auto-iris operation is preferably controlled based on the signal which is substantially equal to the original pixel signals directly outputted from the CCD 22. However, in this conventional video camera apparatus, the luminance signal produced by executing these various process operations to the original pixel signals within the luminance signal processing circuit 27 must be employed.

On the other hand, in another conventional video camera apparatus with separately employing the luminance signal producing unit 35 as shown in FIG. 2, since this luminance signal producing unit 35 merely produces such a luminance signal exclusively directed to the auto-iris/auto-focus detecting purposes, the unnecessary process operations for these detecting operations can be omitted. However, in principle, this conventional video camera apparatus necessarily requires the circuit for performing the luminance signal producing calculations similar to the calculations executed in the luminance signal producing circuit 27. In other words, since two sets of the similar circuit arrangements are required in this video camera apparatus, there is a useless circuit arrangement.

Also, in any cases of FIG. 1 and FIG. 2, the auto-white balance control loop is mixed with the auto-iris control loop.

In particular, it is desirable to execute the white balance control at the pre-stage circuit, rather than at the luminance/chrominance signal process operations. Accordingly, there is no way except that the luminance signal used in the iris control operation is derived at the post-stage circuit of the white balance amplifier 26.

On the other hand, in principle, the iris control implies that brightness is controlled, whereas the white balance control implies that color balance is controlled. When brightness is changed, a color change will occur in response to this brightness change.

As a consequence, as previously described, since the luminance signal used in the iris control should be derived from the post-stage circuit of the white balance amplifier 26 in the conventional video camera apparatuses, the operations of the respective control loops may give adverse influences to the operations of other control loops. Therefore, there is such a drawback that the respective control loops can be hardly converged.

SUMMARY OF THE INVENTION

The present invention has been made to solve these problems, and therefore has an object to provide a video camera apparatus capable of simply extracting, in particular, brightness information used to perform an auto-iris control operation, and further capable of effectively executing control loop operations in order that a plurality of such control loops giving adverse influences to each other are not mixed with each other.

To achieve the above-described object, a video camera apparatus, according to an aspect of the present invention, is comprised of pseudo-luminance information producing unit for multiplying the respective pixel information which is outputted from the solid-state imaging element and is acquired before being inputted into a image signal processing unit to thereby produce a pseudo-luminance information signal; and iris control unit for performing an iris control based on the pseudo-luminance information signal.

In the case that a color filter of the solid-state imaging element is made of a G checkered pattern and R/B line sequential type color filter in which G (green) filters are arranged in a checkered pattern, and R (red) filters and B (blue) filters are alternately arranged every line, the pseudo-luminance information producing unit produces the pseudo-luminance information signal by executing the following calculation: 2G+R+B.

Also the pseudo-luminance information producing unit produces luminance information by multiplexing the respective pixel information which is acquired before being inputted into a white balance control unit including a white balance amplifier.

Since the pseudo-luminance information corresponding to the multiplication value of the pixel information contains the brightness information as the pseudo-luminance signal, the iris control operation can be carried out by employing the multiplication value of the pixel information. Also, in this case, since the luminance signal is not employed in this video camera apparatus, the pixel information acquired before being inputted to the white balance amplifier can be employed.

BRIEF DESCRIPTION OF THE DRAWINGS

For a more better understanding of the present invention, reference is made of a detailed description to be read in conjunction with the accompanying drawings, in which:

FIG. 4 is an explanatory diagram for explaining a pixel structure of a CCD employed in the video camera apparatus shown in FIG. 3.

DETAILED DESCRIPTION OF THE PREFERRED EMBODIMENTS

Figure 3:
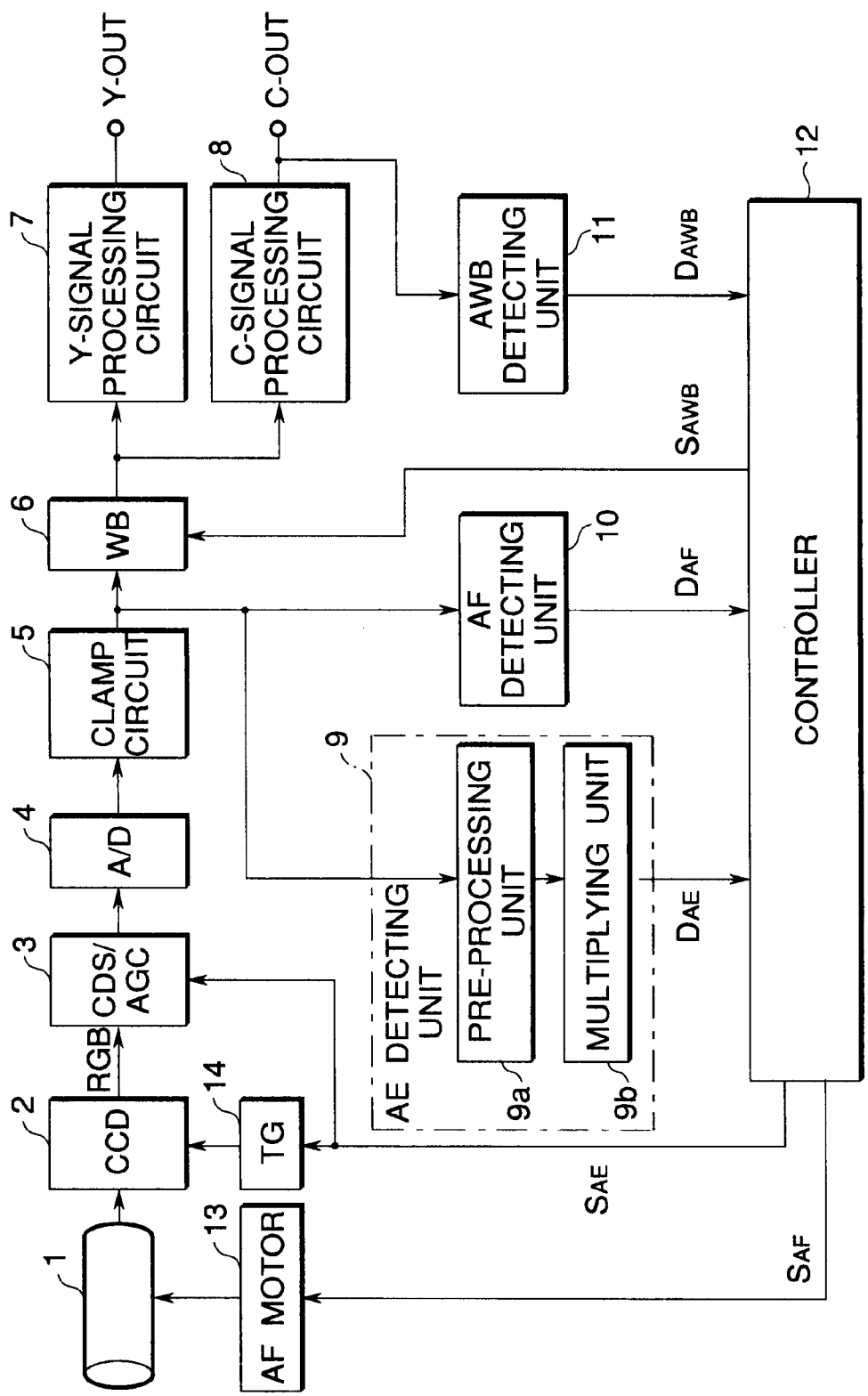
FIG. 3 is a schematic block diagram for indicating a major circuit arrangement of a video camera apparatus according to an embodiment of the present invention.

Referring now to FIG. 3 and FIG. 4, a description will be made of a video camera apparatus according to an embodiment of the present invention. FIG. 3 is a schematic block diagram for representing a major arrangement of a video camera apparatus containing an auto-iris control loop, and auto-focus control loop, and an auto-white balance control loop.

In FIG. 3, as a lens system 1, various lenses are arranged in order to conduct light reflected from an imaging object (not shown in detail) to a CCD 2. A focusing lens provided in this lens system 1 is arranged in such a manner that this focusing lens can be moved along the forward/backward directions by a focus motor 13. As a result, focusing conditions of images may be controlled.

Pixels of the CCD 2 are constructed of, for example, three primary color filters R, G, B (see FIG. 4).

FIG. 4 indicates a pixel structure in the vicinity of an n-th line of this CCD 2. As apparent from this drawing, the respective pixel structures of color filters are made of a G-checkered pattern and R/B line sequential system. In other words, in the n-th line, the (n+2)th line, and the (n+4)th line, the R pixels and the G pixels are alternately formed, whereas in the (n+1)th line, the (n+3)th line, and the (n+5)th line, the G pixels and the B pixels are alternately formed.

As described above, the (R–G) pixel line and the (B–G) pixel line are formed every 1 line. It should be understood that this CCD is of the progressive scan type CCD.

In response to the incident imaging light, this CCD 2 outputs R, G, B pixel signals.

These R, G, B pixel signals outputted from the CCD 2 are supplied to a CDS/AGC circuit (correlated double sampling/auto-gain control circuit) 3. Then, data extracting operation by the correlated double sampling, and also gain control operation are carried out to these R, G, B pixel signals. Thereafter, the processed pixel signals are A/D-converted into digital pixel data by an A/D converter 4. Then, after the digital clamping process is performed to these digital pixel data by a clamp circuit 5, preselected gains are applied to the respective R, G, B pixel data by a white balance amplifier 6 in order to perform the white balance.

After the gain control for the white balance control is carried out, each of the resulting pixel data is supplied to a luminance signal (Y-signal) processing circuit 7 and a chrominance signal processing circuit 8.

In this luminance signal processing circuit 7, the camera process operations such as the γ (gamma)-correction and the white clipping are carried out with respect to the R, G, B pixel data supplied to this luminance signal processing circuit 7 and further a luminance signal (Y-signal) is produced by executing the matrix calculation process with using the R, G, B pixel data. Thus, this luminance signal functioning as the imaging data is supplied from this luminance signal processing circuit 7 to the post-stage circuits.

Also, the chrominance signal processing circuit 8 produces color difference signals "R–Y" and "B–Y" by performing the matrix calculation process with employment of the camera-processed R, G, B pixel data, and thereafter outputs these color difference signals "R–Y" and "B–Y" to the post-stage circuits.

The gains which are applied to the respective color pixel data by the white balance amplifier 6 are controlled by the feedback loop. To execute this feedback control, it is required to detect the signal levels of these color signals, i.e., R (red) signal, G (green) signal, and B (blue) signal. To this end, the R signal, the G signal, and the B signal are extracted from the chrominance signal processing circuit 8, and signal levels thereof are detected by an auto-white balance detecting unit 11. The level information $D_{AWB}$ of the respective color pixel data are supplied to a controller 12 constituted by a microcomputer (not shown in detail), and the gains of the respective colors used in the white balance are calculated.

For example, the gains with respect to the R signal and the B signal are calculated in order that both the R signal and the B signal own the same signal levels with regard to the level of the G signal under such a condition that the reference imaging object is imaged by the video camera apparatus. Then, the white-balance gain control information $S_{AWB}$ is supplied to the white balance amplifier 6 so as to control, for example, the gain of the R signal and the gain of the B signal.

On the other hand, an output of the clamp circuit 5 (namely, signal at pre-stage of white balance amplifier 6) is extracted to be supplied to an auto-iris detecting unit 9 and an auto-focus detecting unit 10.

In the auto-focus detecting unit 10, for example, a high-pass filtering process operation is carried out as to the pixel data outputted from the clamp circuit 5, and thereafter an edge detecting process operation is performed for this filtering-processed pixel data. Then, the edge-detected signals are averaged to produce focus information $D_{AF}$.

In response to the focus information $D_{AF}$, the controller 12 supplies a focus control signal $S_{AF}$ to a focus motor 13 so as to move the focus lens provided in the lens system 1. As a result, proper focusing conditions can be established.

Under the just focusing condition, the edge component of the image data is clearly observed to some extent. As a result, the edge information of the pixel data is detected, and then the focus control operation is carried out by the feedback loop based on this edge information, so that proper focusing conditions can be obtained.

As to the iris control, the pixel data which are supplied if required, are averaged in a pre-processing unit 9a of the auto-iris detecting unit 9. For example, as to the inputted pixel data, the averaging process operation is performed every 4 pixels, and an average value of these 4 pixels is sequentially outputted.

Such pixel data which has been processed by the pre-processing unit 9a is supplied to a multiplying unit 9b of the auto-iris detecting unit 9. This multiplying unit 9b performs the multiplying operation with respect to all of the pixel data for a single image. It should also be noted that the circuit arrangement and the pixel data processing operations can be simplified in accordance with this embodiment. This is because the average value is calculated every 4 pixels, and these average values are sequentially outputted from this pre-processing unit 9a, and when the pixel data for a single image are multiplied in the multiplying unit 9b, a total number of this multiplied data can be reduced by ¼.

As shown in FIG. 4, as the pixel data derived from the CCD 2, both R pixel data and G pixel data are alternately outputted at n-th line timing, whereas G pixel data and B pixel data are alternately outputted at the (n+1)th line timing. In the multiplying unit 9b, the pixel data which are supplied thereto at such color timing are directly added to each other, and the addition result is outputted as brightness information $D_{AE}$.

As a result, the brightness information $D_{AE}$ obtained by adding the pixel data for a single image is expressed by:

$$D_{AE}=K(2G+R+B),$$

where symbol "K" indicates a coefficient used with adding pixel number.

The value (2G+R+B) obtained in the adding process operation becomes substantially equal to a value indicative of brightness information. In other words, in accordance with this embodiment, even when the luminance signal is not utilized, the brightness information such as (2G+R+B), namely pseudo-luminance information can be obtained.

The brightness information $D_{AE}$ derived from this auto-iris detecting unit 9 is furnished to the controller 12. Thus, the controller 12 produces an iris control signal $S_{AE}$ in response to this brightness information $D_{AE}$.

The brightness information $D_{AE}$ is constructed of electronic shutter data for setting the exposure time of the CCD 2, and AGC gain data.

This electronic shutter data is supplied to a timing generator 14. The timing generator 14 generates a timing signal in response to the electronic shutter data, and controls the exposure time of the CCD 2 based on this timing signal. This exposure time control operation corresponds to the iris control operation. Also, the AGC gain data is supplied to the AGC circuit 3 so as to set the gain of the AGC circuit 3. In other words, the brightness control is electrically carried out in the AGC circuit 3, which also corresponds to the iris control operation.

It should also be noted that although the iris control operation is performed by controlling the exposure time of the CCD 2 as the electronic shutter, this iris control operation may be alternatively performed by employing a mechanical iris mechanism. In this alternative case, as the iris control signal $S_{AE}$, motor control data corresponding to the above-described electronic shutter data is generated, and a drive motor of the iris mechanism is driven/controlled by this motor control data.

As previously explained, in accordance with this embodiment, the information used in the iris control operation is produced not from the luminance signal derived from the luminance signal processing circuit 7, but from the multiplication signal of (2G+R+B).

Figure 1:
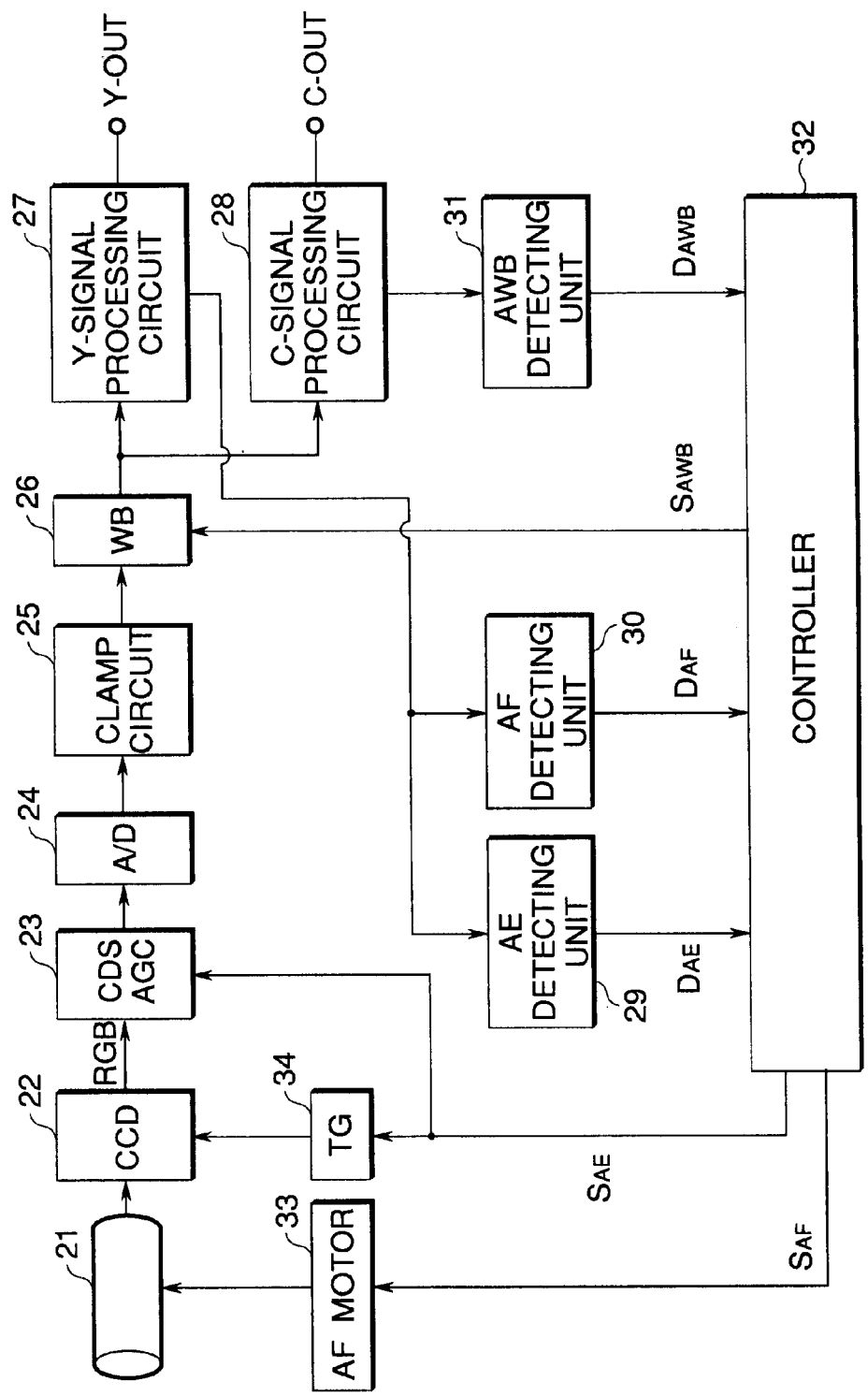
FIG. 1 is a schematic block diagram for representing the circuit arrangement of one conventional video camera apparatus.
Figure 2:
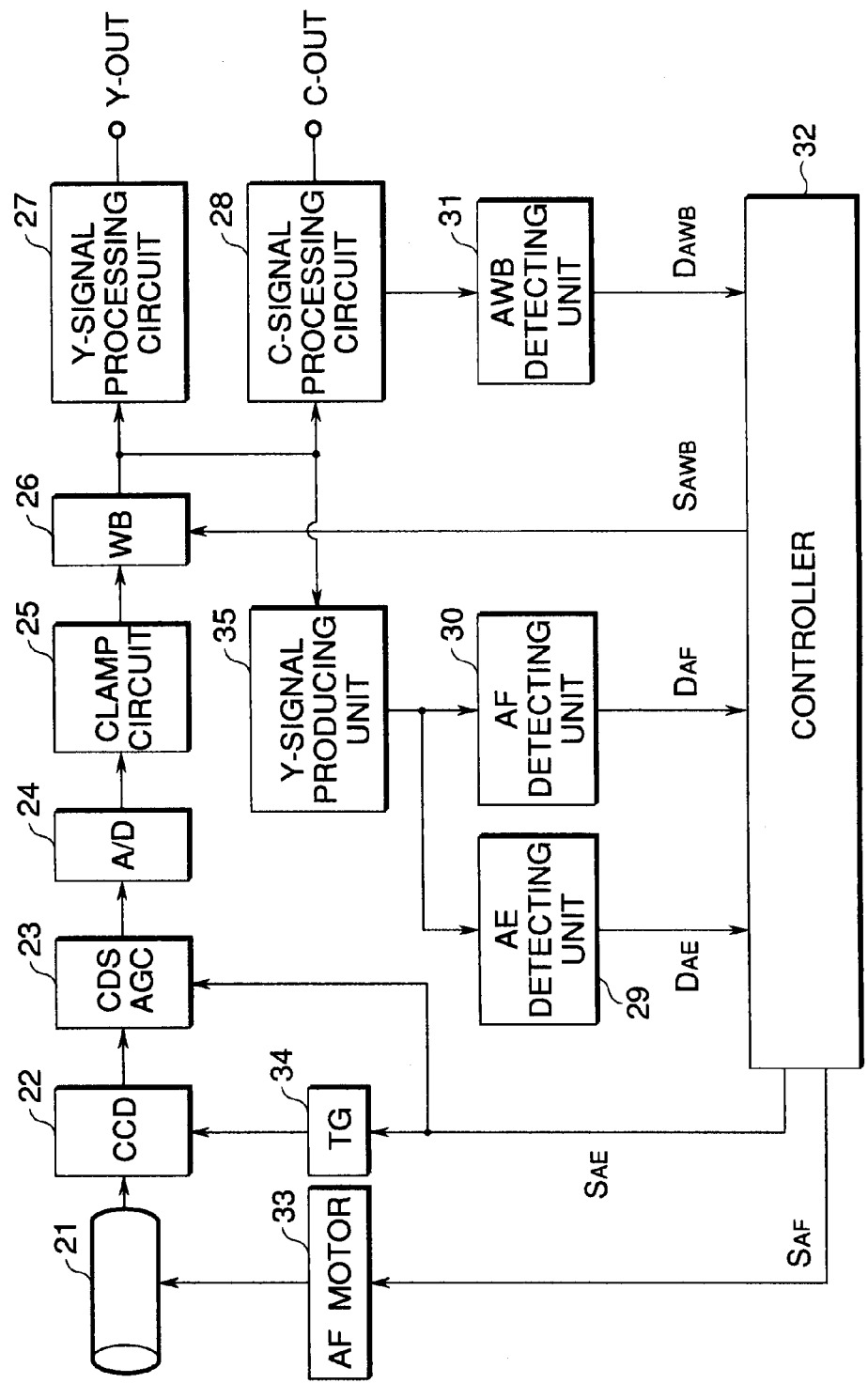
FIG. 2 is a schematic block diagram for showing the circuit arrangement of another conventional video camera apparatus.

As a consequence, the video camera apparatus according to this embodiment need not independently employs such a luminance signal producing unit as shown in FIG. 2, so that the overall circuit arrangement need not requires such a useless circuit, but also the pseudo-luminance information used in the iris control operation can be produced by the simple signal processing manner.

Preferably, the white balance amplifier 6 is provided at the pre-stage of the luminance signal processing circuit 7 and the chrominance signal processing circuit 8. As to the iris control operation, since such a multiplication signal of (2G+R+B) is used, the luminance signal is no longer derived from the luminance signal processing circuit 7 which constitutes the post-stage of the white balance amplifier 6. Then, as previously explained, this multiplication signal of (2G+R+B) may be produced from the data outputted from the clamp circuit 5. Thus, in accordance with the circuit arrangement of this embodiment, the iris control loop is not mixed with the white balance control loop.

In other words, the iris control loop can be separated from the white balance control loop on the signal paths, while the feedback loops thereof may give the adverse influences to each other. As a result, each of these control loops can be effectively converged without being adversely influenced by other control loops.

On the other hand, in the case of FIG. 3, it is apparent that the auto-iris control loop and the auto-focus control loop do not constitute the independent control loops in the signal path system. However, since the focusing condition does not give a large adverse influence to the brightness condition, there is no specific problem.

It should also be noted that although the multiplying unit 9b multiplies the pixel data for a single image (namely, 1 frame image) in the above-described embodiment, the multiplying range is not limited thereto. To acquire such brightness information as (2G+R+B), at least the pixel data for the even-numbered lines may be multiplied.

Also, although the CCD 2 is employed as the solid-state imaging element in the above-described embodiment, a BBD (bucket brigade device) may be employed as the imaging device.

As previously described, in accordance with the video camera apparatus of the present invention, the respective pixel information is multiplied with each other, which is outputted from the solid-state imaging element, and is acquired at the pre-stage of the image signal processing circuit so as to produce the pseudo-luminance information. Based on this pseudo-luminance information, the iris control operation is carried out. As a result, such a luminance signal acquired by executing the complex process operations is no longer employed in order to perform the iris control operation. Thus, it is possible to produce the signal used in the auto-iris control operation by a simple circuit arrangement. In particular, in such a case that the color filter of the solid-state imaging element is made of the G checkered pattern and the R/B line sequential system, the pseudo-luminance information functioning as the proper brightness information of (2G+R+B) can be obtained only by multiplying the pixel information. As a consequence, the proper iris control operation can be realized.

Also, a white balance amplifier is preferably arranged at a pre-stage of a luminance/color signal processing unit. However, since the pseudo-luminance information used in the iris control operation according to the present invention is not equal to, a so-called "luminance signal", but equal to the multiplication value of the respective pixel information, the pseudo-luminance information producing means can multiply the respective pixel information acquired at the pre-stage of the white balance amplifier to thereby produce such pseudo-luminance information. As a consequence, the video camera apparatus of the present invention can be constituted without mixing the auto-iris control loop with the auto-white balance control loop. Therefore, the respective control loops can be effectively converged.

What is claimed is:

1. A video camera apparatus comprising:

a solid-state imaging element having a plurality of pixels arranged in a matrix form, a color filter being arranged with respect to each of said pixels;

image signal processing means for producing image information constructed of luminance information and color information based on the respective pixel information outputted from said solid-state imaging element;

averaging means for averaging a predetermined amount of the respective pixel information;

pseudo-luminance information producing means for multiplying the averaged pixel information which is outputted from said solid-state imaging element and is acquired before being inputted into said image signal processing means to thereby produce a pseudo-luminance information signal; and iris control means for performing an iris control based on said pseudo-luminance information signal.

2. A video camera apparatus as claimed in claim 1 wherein:

said color filter is a G (green) checkered pattern and R (red)/B (blue) line sequential type color filter; and said pseudo-luminance information producing means produces said pseudo-luminance information signal by executing the following calculation:

$$2G+R+B.$$

3. A video camera apparatus as claimed in claim 1, further comprising:

white balance control means for performing a white balance control by controlling a gain of pixel information outputted from said solid-state imaging element with respect to each of colors based on color information obtained by said image signal processing means; wherein:

said pseudo-luminance information producing means produces luminance information by multiplexing the respective pixel information which is acquired before being inputted into said white balance control means.

4. A video camera apparatus as claimed in claim 3, further comprising:

luminance signal producing means for entering therein the pixel information outputted from said white balance control means to produce a luminance signal from said pixel information;

color signal producing means for entering therein the pixel information outputted from said white balance control means to produce a color signal; and white balance detecting means for detecting a white balance condition in response to said color signal; wherein:

said white balance control means controls a gain of the pixel information with respect to each of colors based on the detection result of said white balance detecting means.

5. A video camera apparatus as claimed in claim 1 wherein:

said iris control means is a mechanical iris.

6. A video camera apparatus as claimed in claim 1 wherein:

said iris control means controls exposure time of said solid-state imaging element to control the iris.

7. A video camera apparatus as claimed in claim 1 wherein:

said iris control means is gain control means for controlling a gain of the pixel information outputted from said solid-state imaging element.

8. A video camera apparatus as claimed in claim 1, further comprising:

focus detecting means for detecting a focus condition based on pixel information identical to the pixel information inputted to said pseudo-luminance information producing means; and focus control means for controlling a focusing condition of an optical image entered into said solid-state imaging element based on the detection result of said focus detecting means.

* * * * *